Patented Oct. 16, 1928.

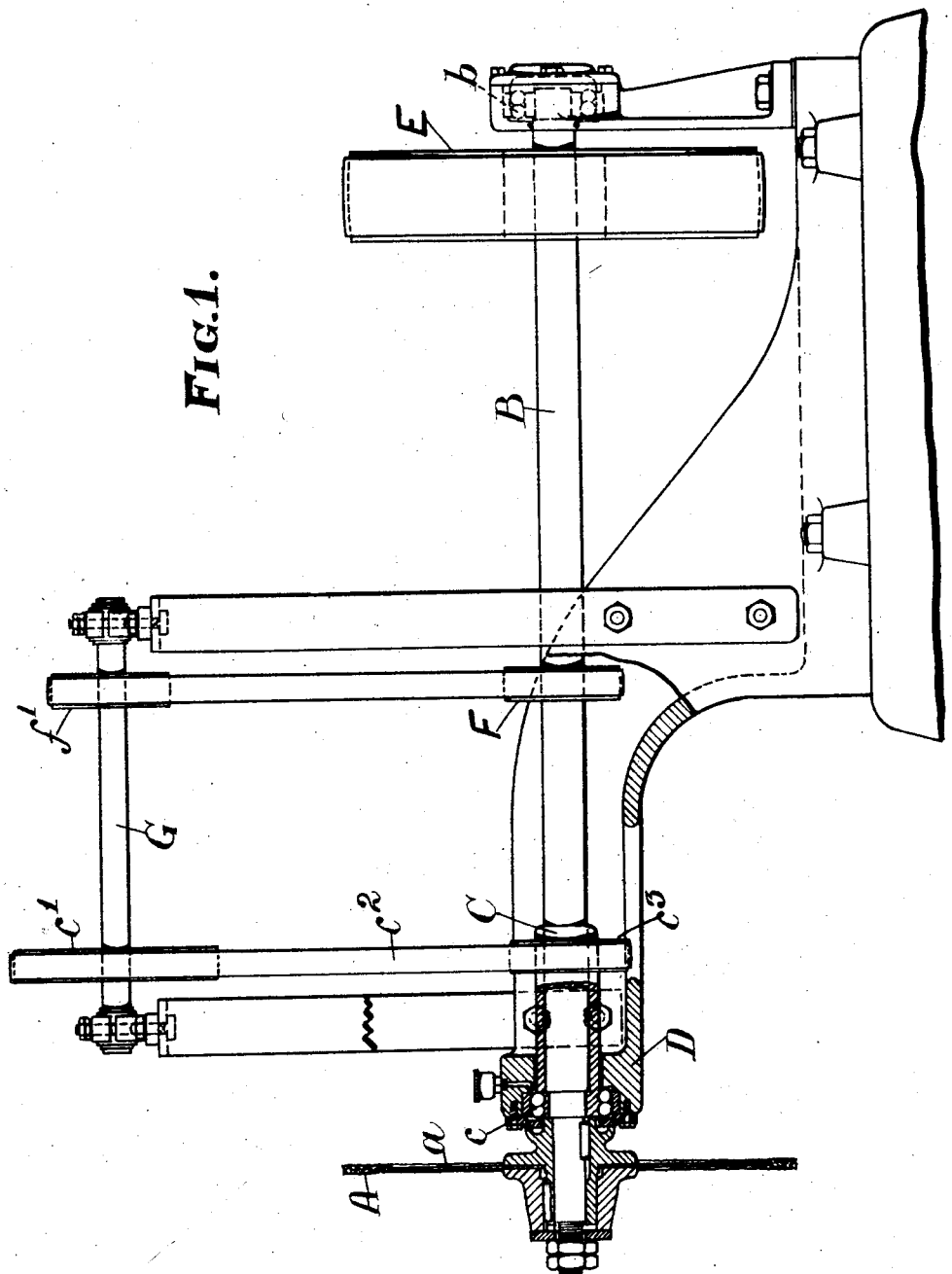

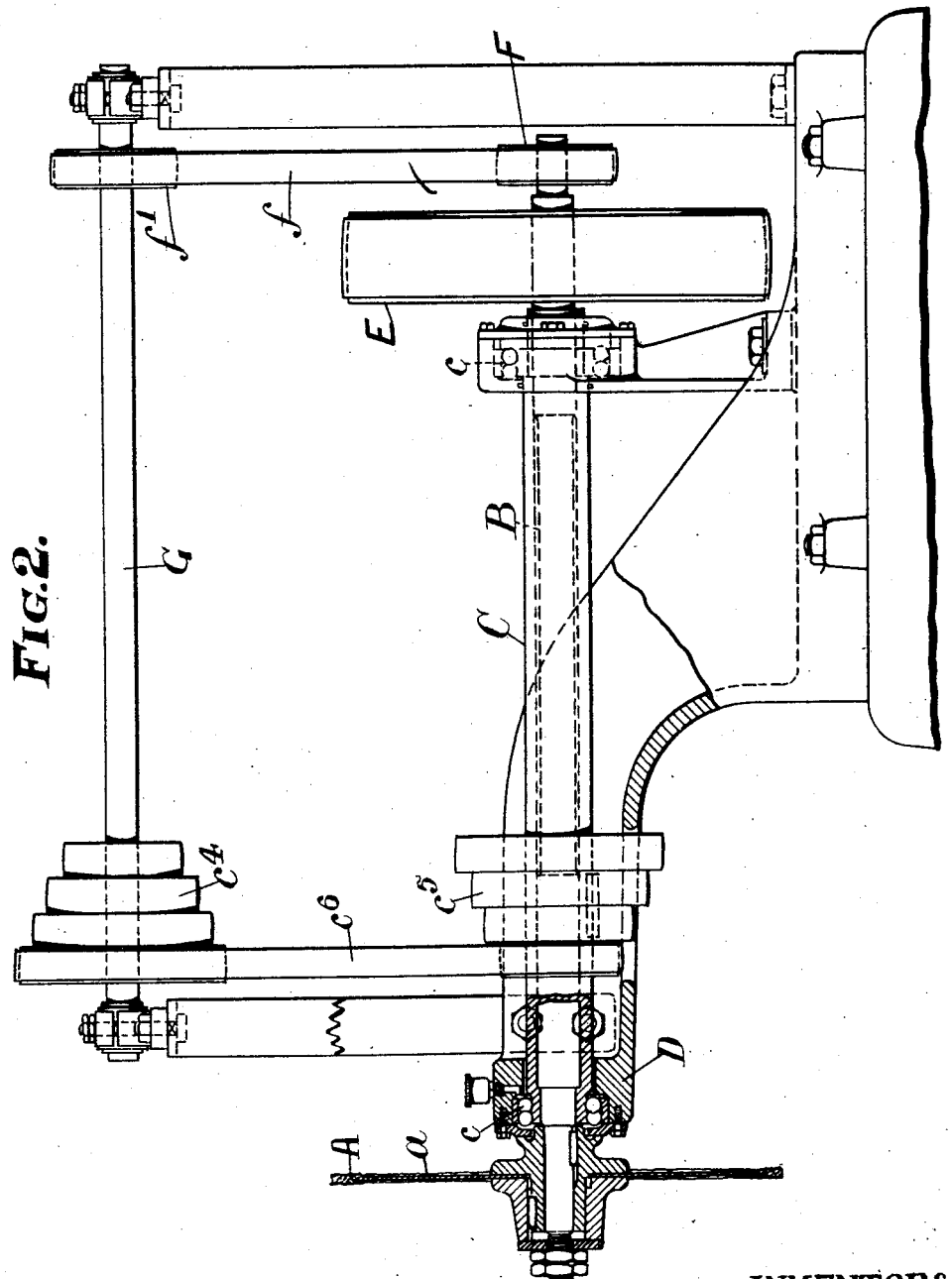

1,687,965

UNITED STATES PATENT OFFICE.

ERIC AINLEY AND HAROLD AINLEY, OF STOCKS MOOR, NEAR HUDDERSFIELD, ENGLAND.

APPARATUS FOR CUTTING STONE AND LIKE MATERIAL.

Application filed November 1, 1926, Serial No. 145,607, and in Great Britain November 9, 1925.

This invention relates to apparatus for cutting gritstone, that is to say stone mainly or partly composed of grit, or sand usually silica such as hard York and the like, also for cutting marble, slate, limestone, and like materials and has for its chief object to introduce an improved form of apparatus which will perform the cutting or sawing operation quicker and more economically. This sawing or cutting operation is usually performed by means of a grinding wheel or circular saw or cutter hereinafter referred to as wheel which exerts a continuous cutting or grinding action on the material.

According to this invention a cutting wheel or blade is mounted on a shaft which is rotatably mounted in an eccentric sleeve which rotates at a different speed to the shaft to cause the wheel to operate intermittently with a percussive as well as an abrasive action upon the material and present a fresh portion of the peripheral surface of the wheel to the material at each revolution.

In order that the said invention may be clearly understood and readily carried into effect, the same is described more fully with reference to the accompanying drawings, in which :—

Fig. 1 is an elevation partly in section of a stone cutting machine constructed according to this invention.

Fig. 2 is a similar view to Fig. 1 showing a modified construction.

In the example shown a cutting wheel A is mounted on a shaft B carried at its rear end in a self aligning bearing $b$. The front end of the shaft carries an eccentric sleeve C which forms the inner ring of a ball bearing $c$ of which the outer ring is clamped in a pocket formed in the machine frame D. The shaft B is driven by a belt on a pulley E and it is provided with a pulley F which transmits a drive to a countershaft G by means of a belt $f$ and pulley $f^1$. Fixed on the countershaft G is a pulley $c^1$ which transmits a drive to the eccentric sleeve C by means of a belt $c^2$ and pulley $c^3$ that is rigidly fixed on the sleeve C. The pulleys $c^3$ and $c^1$ are so proportioned that the sleeve C is driven at a relatively different speed to the shaft B, whereby the wheel A in addition to rotating around its own axis, rotates eccentrically with a planetary motion and attacks the material with a percussive and abrasive action, a fresh peripheral portion of the wheel being presented to the material at each percussion to provide for wear and maintain the eccentric path. The wheel saws the material as the material is moved in the plane of the wheel past the shaft B, in order that the wheel will have the action as indicated. In the example shown in Fig. 2 the sleeve C is supported at each end in ball bearings $c$ and a drive is transmitted from the countershaft G to the sleeve C by stepped cones $c^4$, $c^5$, and belt $c^6$. If desired an additional eccentric sleeve may be provided for varying the eccentricity of the movement of the shaft B in Figs. 1 and 2. If desired the drive from the shaft B and countershaft G to the sleeve C may be omitted as the sleeve will creep round naturally upon the shaft B during the cutting operation, and thereby impart an eccentric motion to the shaft. The cutting wheel comprises carborundum or other cutting material molded on a metal plate $a$.

By operating the sawing or cutting wheel in the manner described it ploughs or punches the material away in addition to grinding it, with the result that the sawing or cutting operation is performed more expeditiously and economically with a saving of power and energy.

What we claim as our invention and desire to secure by Letters Patent in the United States is:—

1. In apparatus for cutting stone and the like, the combination of a rotary shaft, a sawing wheel rigidly fixed thereon for cutting the material when moved in the plane of said wheel past said shaft, an eccentric sleeve rotatably mounted on said shaft, a bearing for said sleeve, and means for causing the wheel and sleeve to rotate at relatively different speeds.

2. In apparatus for cutting stone and the like, the combination of a rotary shaft, a sawing wheel rigidly fixed thereon for cutting the material when moved in the plane of said wheel past said shaft, an eccentric sleeve rotatably mounted on said shaft, a bearing for said sleeve in proximity to the cutting wheel, a self aligning bearing for the shaft at the end that is remote from the cutting wheel, and means for causing the wheel and sleeve to rotate at relatively different speeds.

3. In apparatus for cutting stone and the like, a rotary shaft, a sawing wheel fixed thereon for cutting the material when moved in the plane of said wheel past said shaft, and means mounting said shaft for planetary motion.

4. In apparatus for cutting stone and the like, a rotatable member, and a sawing wheel carried by said member eccentrically thereof for rotation independently of the rotation of said member adapted for cutting the material when moved in the plane of said wheel past said member.

5. In apparatus for cutting stone and the like, a rotatable member, a shaft mounted for rotation therein eccentrically thereof, and a sawing wheel fixed on said shaft for cutting the material when moved in the plane of said wheel past said shaft.

In testimony whereof we affix our signatures.

ERIC AINLEY.
HAROLD AINLEY.